United States Patent

Yamakawa et al.

[11] Patent Number: 5,639,215
[45] Date of Patent: Jun. 17, 1997

[54] HELICOPTER ROTOR EQUIPPED WITH FLAPS

[75] Inventors: Eiichi Yamakawa; Noboru Kobiki; Eiji Shima, all of Kakamigahara, Japan

[73] Assignee: Advanced Technology Institute of Commuter-Helicopter, Ltd., Gifu, Japan

[21] Appl. No.: 607,103

[22] Filed: Feb. 26, 1996

[30] Foreign Application Priority Data

Mar. 27, 1995 [JP] Japan ................... 7-068415

[51] Int. Cl.$^6$ ................................. B64C 27/615
[52] U.S. Cl. .................. 416/23; 244/212; 244/215
[58] Field of Search ............... 416/23, 24; 244/215, 244/17.25, 210–211, 212, 217, 213–214

[56] References Cited

U.S. PATENT DOCUMENTS

| | | | |
|---|---|---|---|
| 2,497,465 | 2/1950 | Mullin | 416/24 |
| 2,642,143 | 6/1953 | Miller | 416/24 |
| 2,776,718 | 1/1957 | Zuck | 416/24 |
| 3,077,934 | 2/1963 | Hartswick. | |
| 3,129,769 | 4/1964 | Hofbauer et al.. | |
| 3,213,944 | 10/1965 | Nichols et al. | 416/24 |
| 3,589,831 | 6/1971 | Lemnios et al.. | |
| 4,461,611 | 7/1984 | Michel | 416/24 |

FOREIGN PATENT DOCUMENTS

| | | |
|---|---|---|
| 6107293 | 4/1994 | Japan. |
| 759672 | 10/1956 | United Kingdom. |

OTHER PUBLICATIONS

European Search Report, European Patent Office, Application No. EP 96 20 0549, Date of completion of the search: 1 Jul. 1996, 4 pages.

*Primary Examiner*—Christopher Verdier
*Attorney, Agent, or Firm*—Baker & Botts, L.L.P.

[57] ABSTRACT

A blade of the rotor is attached to a main rotor shaft, and is rotated counterclockwise at a high speed when viewed from above. In the vicinity of the blade tip, a flap having a wing shape in section is pivotally supported with a hinge so as to be angularly displaceable and at the end a part of the rear end of the blade is cut out. A hinge line which indicates the center of the angular displacement of the hinge is formed so as to be parallel to a straight line passing through the rotation center of the rotor and the center of gravity of the flap. A helicopter rotor equipped with flaps is provided in which the influence of the centrifugal force acting on the center of gravity of a blade can be largely reduced, and a flap control mechanism can be reduced in size and weight.

1 Claim, 4 Drawing Sheets

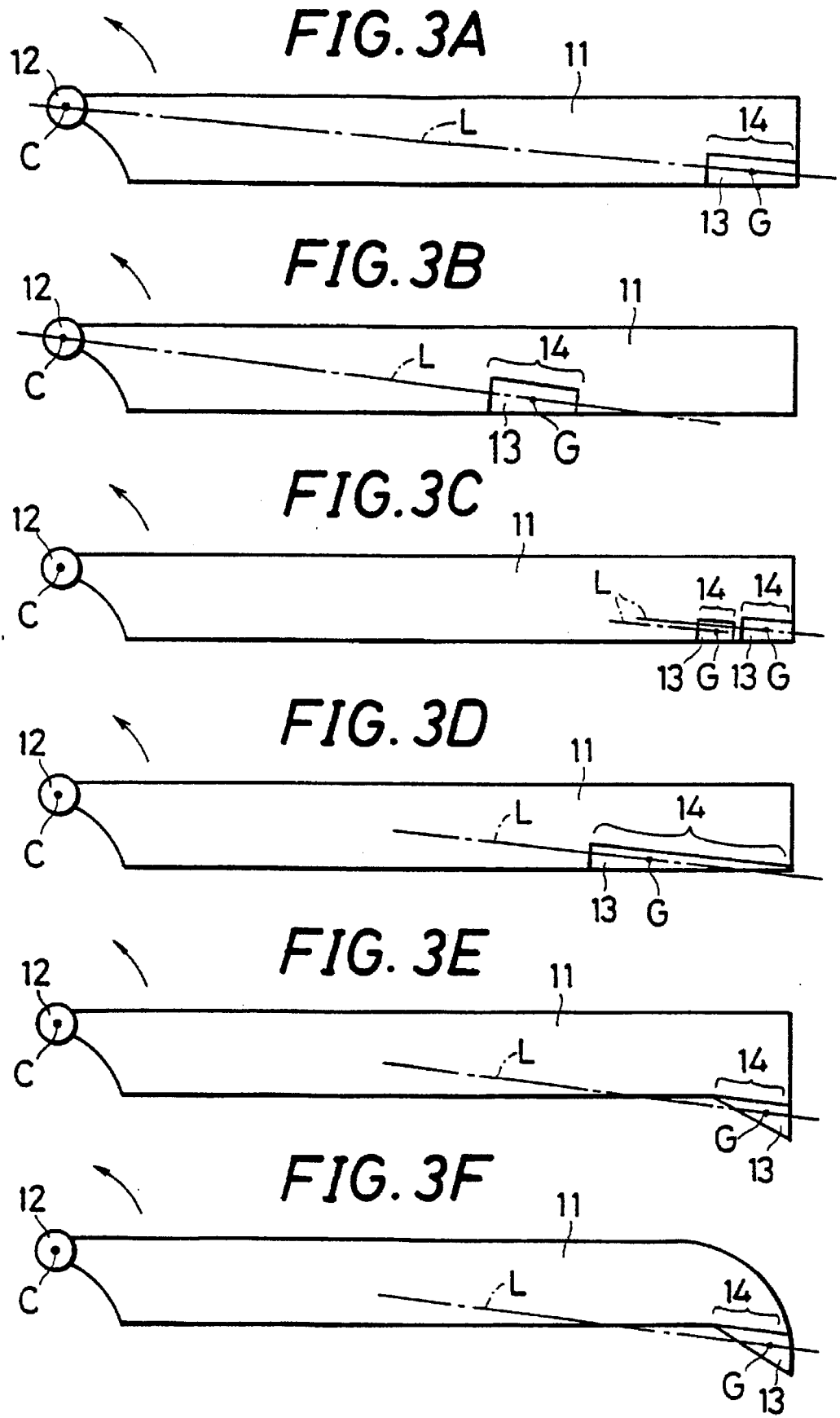

HELICOPTER ROTOR EQUIPPED WITH FLAPS

BACKGROUND OF THE INVENTION

1. Field of the Invention

The present invention relates to a helicopter rotor equipped with flaps.

2. Description of the Related Art

A helicopter is generally maneuvered by controlling a pitch angle in a blade root of a main rotor by means of actuators, swash plates, link mechanisms, and the like.

The helicopter rotor is a high-speed rotatable element. Additionally the vibration level of the helicopter rotor is considerably high, so that a highly accurate mechanism is required for controlling the pitch angle of a blade. The aerodynamic moment generated about the feathering axis over the whole blade is large. In order to change the pitch angle of the blade against the mass of the rotor and control mechanism, a high-power actuator and a high-power hydraulic mechanism are required. Such requirements result in difficulty in reducing the weight of the structure of the helicopter.

As a countermeasure against such drawbacks, a method is proposed in which a relatively small flap is attached to the vicinity of a blade tip where a dynamic pressure is sufficiently high, and the pitch angle of a blade is controlled by utilizing a large aerodynamic force generated in that portion (for example, Japanese Unexamined Patent Publication JPA 6-107293 (1994) and U.S. Pat. Nos. 3,077,934, 3,129,769, 3,589,831, and 4,461,611). The attachment of a flap to the vicinity of a blade tip enables the pitch angle to be controlled with a small control force, so that the whole control mechanism can be reduced in weight as well as in size.

In a prior art helicopter rotor, a large centrifugal force due to the high-speed revolution of the rotor acts on the center of gravity of a flap. In the vicinity of the blade tip, for example, the centrifugal force has a large value which is about 1,000 times as large as the gravity.

FIG. 4 is a partial perspective view showing an example of a prior art of helicopter rotor. A blade 1 of the rotor is attached to a main rotor shaft 2, and rotated at a high speed in a counterclockwise direction when viewed from above. In the vicinity of a tip of the blade 1, a flap 3 having a wing shape in section is pivotally supported with a hinge (not shown) so as to be angularly displaceable and at the end a part of a rear end of the blade 1 is cut out. A hinge line 4 indicating the center of the angular displacement of the hinge is set in parallel to the spanwise direction of the blade 1, and crosses a straight line L passing through the rotation center C of the rotor and the center of gravity G of the flap, at about 2.5 degrees.

The centrifugal force CF acting on the center of gravity G of the flap is split into a component force F1 alone the hinge line 4, a component force F2 alone a wing chord direction of the flap 3 in a plane perpendicular to the hinge line 4, and a component force F3 alone a wing thickness direction of the flap 3. The component forces F1 and F2 are supported by the hinge, but the component force F3 acts as a hinge moment about the hinge line 4 so as to angularly displace the flap 3.

In this way, a centrifugal force affects a hinge moment of the flap, and the following problems arise:

1) The moment due to the centrifugal force serves as additional load, so that the load conditions for the flap control mechanism become more severe, and it is difficult to design a compact mechanism.

2) Since it is necessary to increase the output power of a flap control actuator, it is difficult to design a compact actuator and a compact hydraulic system.

3) A component of the centrifugal force which is along a flap thickness direction causes torsion or flapping in the blade, so that there occurs an aeroelastic phenomenon which may cause an unexpected change in an effective angle of attack of a blade element, and the aeroelastic phenomenon adversely affects the flight performance, the flight characteristics, and the vibration level.

SUMMARY OF THE INVENTION

An object of the invention is to provide a helicopter rotor equipped with flaps in which the influence of a centrifugal force acting on the center of gravity of a flap is largely reduced, and the size and a flap control mechanism can be reduced in size and weight.

The invention provides an improved helicopter rotor equipped with flaps in which a hinge for pivotally supporting a flap in an angularly displaceable manner in relation to a blade is disposed, where the improvement comprises:

a hinge line formed in parallel to a straight line which passes through the rotation center of the rotor and the center of gravity of the flap.

According to the invention, the hinge line is formed so as to be parallel to a straight line passing through the rotation center of the rotor and the center of gravity of the flap. Therefore, the centrifugal force acting on the center of gravity of the flap acts in parallel to the hinge line, so that the hinge moment about the hinge line consists of only an aerodynamic moment, and the hinge moment is largely reduced. As a result, it is possible to realize compact designs of a flap control mechanism, a control actuator and a hydraulic system. In addition, since an additional load does not act on the flap, good flight characteristics of the helicopter are assured.

BRIEF DESCRIPTION OF THE DRAWINGS

Other and further objects, features, and advantages of the invention will be more explicit from the following detailed description taken with reference to the drawings wherein:

FIGS. 3A–3F are partial plan views showing various examples of the shape of a flap.

DETAILED DESCRIPTION OF THE PREFERRED EMBODIMENTS

Figure 1:
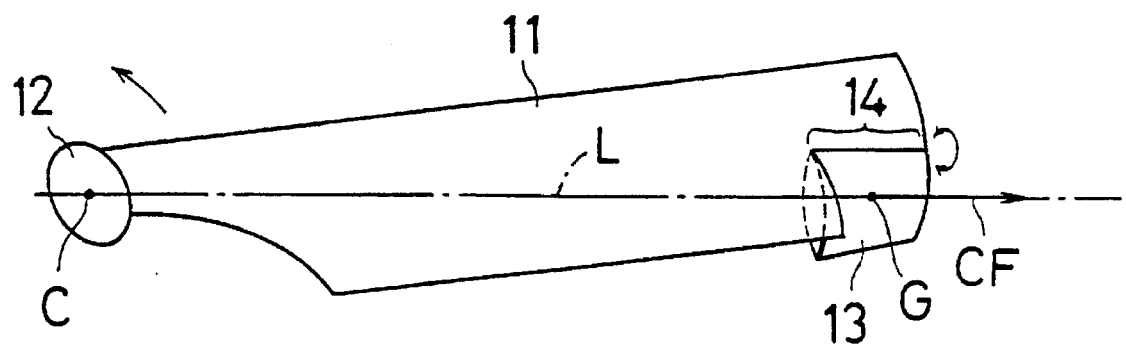
FIG. 1 is a partial perspective view showing an embodiment of the invention.

Now referring to the drawings, preferred embodiments of the invention are described below.

FIG. 1 is a partial perspective view showing an embodiment of the invention. A blade 11 of the rotor is attached to a main rotor shaft 12, and rotated at a high speed in a counterclockwise direction when viewed from above. In the vicinity of a tip of the blade 11, a flap 13 having a wing shape in section is pivotally supported with a hinge (not shown) so as to be angularly displaceable and at the end a part of the rear end of the blade 11 is cut out. A hinge line 14 indicating the center of the angular displacement of the hinge is formed in parallel to a straight line L which passes through the rotation center C of the rotor and the center of gravity G of the flap. For example, the hinge line 14 forms an angle of about 2.5 degrees with a straight line along the blade spanwise direction.

Figure 4:
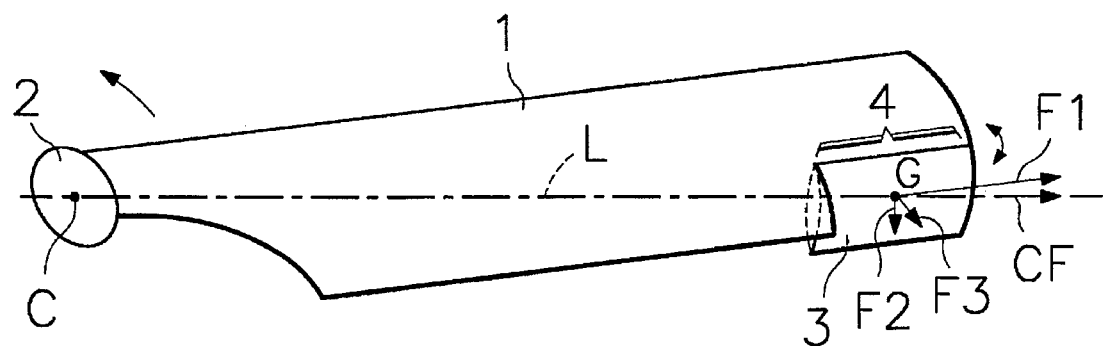
FIG. 4 is a partial perspective view showing an example of a prior art of helicopter rotor.

The centrifugal force CF acting on the center of gravity G of the flap acts in parallel to the hinge line 14, so that the hinge moment about the hinge line consists of only an aerodynamic moment. Accordingly, the hinge moment is largely reduced, which is about 1/5 times as much as that acting in the prior art rotor shown in FIG. 4. Therefore, the control mechanism for the flap 13, a control actuator, and a hydraulic system can be reduced in size and weight, and compact design can be realized, and additionally good flight characteristics of the helicopter are assured.

Figure 2A:
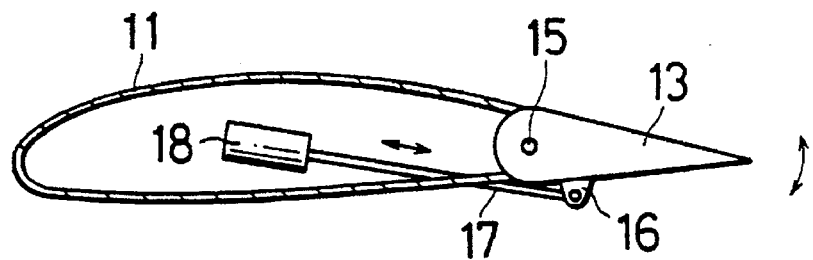
FIGS. 2A–2C show examples of a flap control mechanism.
Figure 2B:
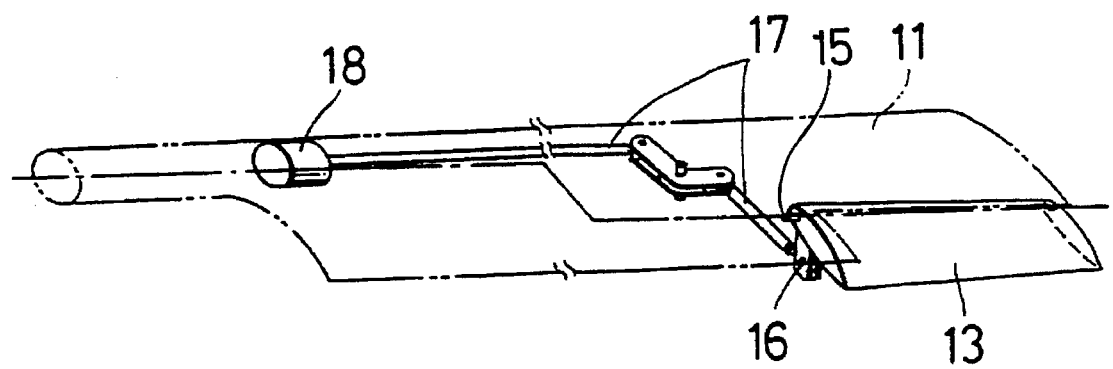
Figure 2C:
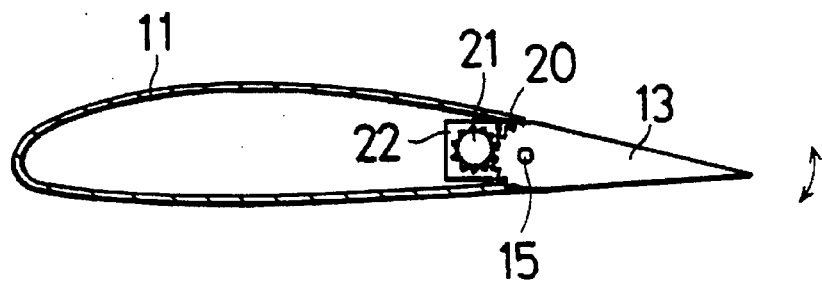

FIGS. 2A–2C show examples of the flap driving mechanism. In FIG. 2A, the flap 13 is pivotally attached to the blade 11 with a hinge 15, and another hinge 16 is attached to a lower face of the flap 13. The hinge 16 is coupled by a pin to a push-pull rod 17 which is driven by an actuator 18. Depending on the amount of linear displacement of the push-pull rod 17, the angle of the flap 13 is controlled.

FIG. 2B shows an example in which the position of the actuator 18 is moved to the inside portion of the blade where the centrifugal force is small.

On the other hand, in FIG. 2C, the flap 13 is pivotally attached to the blade 11 with a hinge 15. A rack 20 is formed in a portion of a circumferential face of the flap 13, and a pinion 21 which is engaged with the rack 20 is driven by a servo motor 22. Depending on the rotation amount of the servo motor 22, the angle of the flap 13 is controlled.

FIGS. 3A–3F are partial plan views showing various examples of the shape of the flap. In the example shown in FIG. 3A, in a similar way to that shown in FIG. 1, a flap 13 having a wing shape in section is pivotally supported in the vicinity of the tip of the blade 11 so as to be angularly displaceable and at the end a part of the rear end of the blade 11 is cut out. The hinge line 14 is set in parallel to the straight line L passing through the rotation center C of the rotor and the center of gravity G of the flap.

In FIG. 3B, a flap 13 is pivotally supported at a middle position between the blade tip and the blade root of the blade 11. The hinge line 14 is set in parallel to the straight line L passing through the rotation center C of the rotor and the center of gravity G of the flap.

In FIG. 3C, two flaps are pivotally supported in the vicinity of the blade tip of the blade 11 so that they are independently controlled. Each of the hinge lines 14 is set in parallel to the straight line L passing through the rotation center C of the rotor and the center of gravity G of the flap.

In FIG. 3D, a triangular flap 13 is pivotally supported in the vicinity of the blade tip of the blade 11. The hinge line 14 is set in parallel to the straight line L passing through the rotation center C of the rotor and the center of gravity G of the flap.

In FIG. 3E, a triangular flap 13 is pivotally supported in the vicinity of the blade tip of the blade 11 so as to be protruded from the rear end of the blade 11. The hinge line 14 is set in parallel to the straight line L passing through the rotation center C of the rotor and the center of gravity G of the flap.

In FIG. 3F, the blade is formed so that the end face in the vicinity of the blade tip has a smoothly curved shape, and a triangular flap 13 is pivotally supported so as to be protruded from the distal end of the blade. The hinge line 14 is set in parallel to the straight line L passing through the rotation center C of the rotor and the center of gravity G of the flap.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. In a helicopter rotor equipped with flaps in which a hinge for pivotally supporting each flap in an angularly displaceable manner in relation to a blade is disposed, the improvement comprising:

a hinge line formed in parallel to a straight line which passes through the rotation center of the rotor and the center of gravity of a respective flap.

* * * * *